United States Patent [19]
Whittenberger

[11] Patent Number: 5,174,968
[45] Date of Patent: * Dec. 29, 1992

[54] STRUCTURE FOR ELECTRICALLY HEATABLE CATALYTIC CORE

[75] Inventor: William A. Whittenberger, Garrettsville, Ohio

[73] Assignee: W. R. Grace & Co.-Conn., New York, N.Y.

[ * ] Notice: The portion of the term of this patent subsequent to Dec. 10, 2008 has been disclaimed.

[21] Appl. No.: 626,672

[22] Filed: Dec. 12, 1990

[51] Int. Cl.[5] ............................................. F01N 3/28
[52] U.S. Cl. .................................... 422/174; 422/180; 55/DIG. 30; 60/299; 60/300; 502/439; 502/527
[58] Field of Search ............................. 422/180, 174; 55/DIG. 30; 60/299, 300; 502/439, 527

[56] References Cited

U.S. PATENT DOCUMENTS

| | | | |
|---|---|---|---|
| 3,770,389 | 10/1973 | Kitzner | 422/174 |
| 4,381,590 | 5/1983 | Nonnenmann et al. | 29/890 |
| 4,777,158 | 10/1988 | Cyron | 502/527 X |
| 4,928,485 | 5/1990 | Whittenberger | 502/527 X |
| 5,070,694 | 12/1991 | Whittenberger | 422/180 X |

FOREIGN PATENT DOCUMENTS

| | | |
|---|---|---|
| 0245736 | 5/1987 | European Pat. Off. . |
| 0351841 | 7/1989 | European Pat. Off. . |
| 8812924 | 1/1989 | Fed. Rep. of Germany . |

Primary Examiner—Robert J. Warden
Assistant Examiner—Stephanie Blythe
Attorney, Agent, or Firm—Edward J. Cabic

[57] ABSTRACT

There is provided an improved electrically heatable core for an electrically heatable catalytic converter. The core is characterized by corrugated thin metal strips and flat thin metal strips in alternating relation with each other and secured to an electrically conductive central core or tube. Alternating with the corrugated thin metal strips and the flat thin metal strips are areas of brazing metal in an axially staggered pattern. These strips are spirally wound and fused to braze them together in a unified monolith. A retainer shell is supplied to hold the monolith together. The core is placed in a housing fitted with insulated means for conducting electric current to the monolith to effect heating. The housing is then inserted in an exhaust line where it is effective to control start-up pollution, and where the monolith is constrained against telescoping.

14 Claims, 2 Drawing Sheets

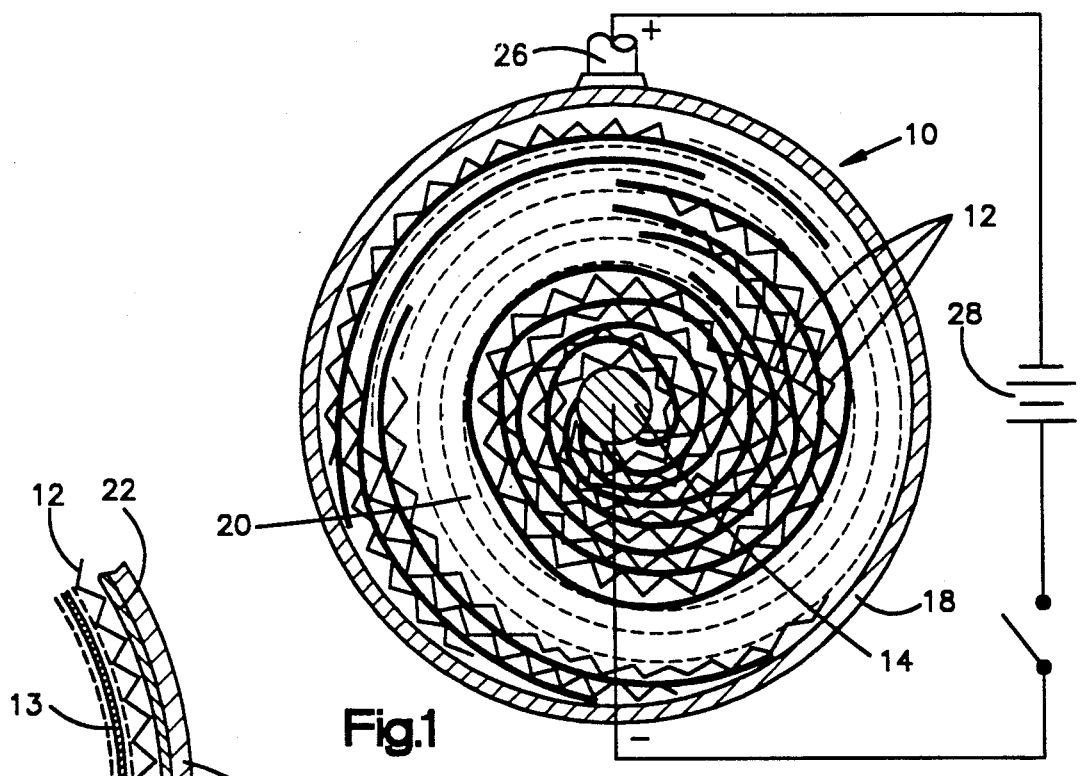
Fig.1
Fig.1a
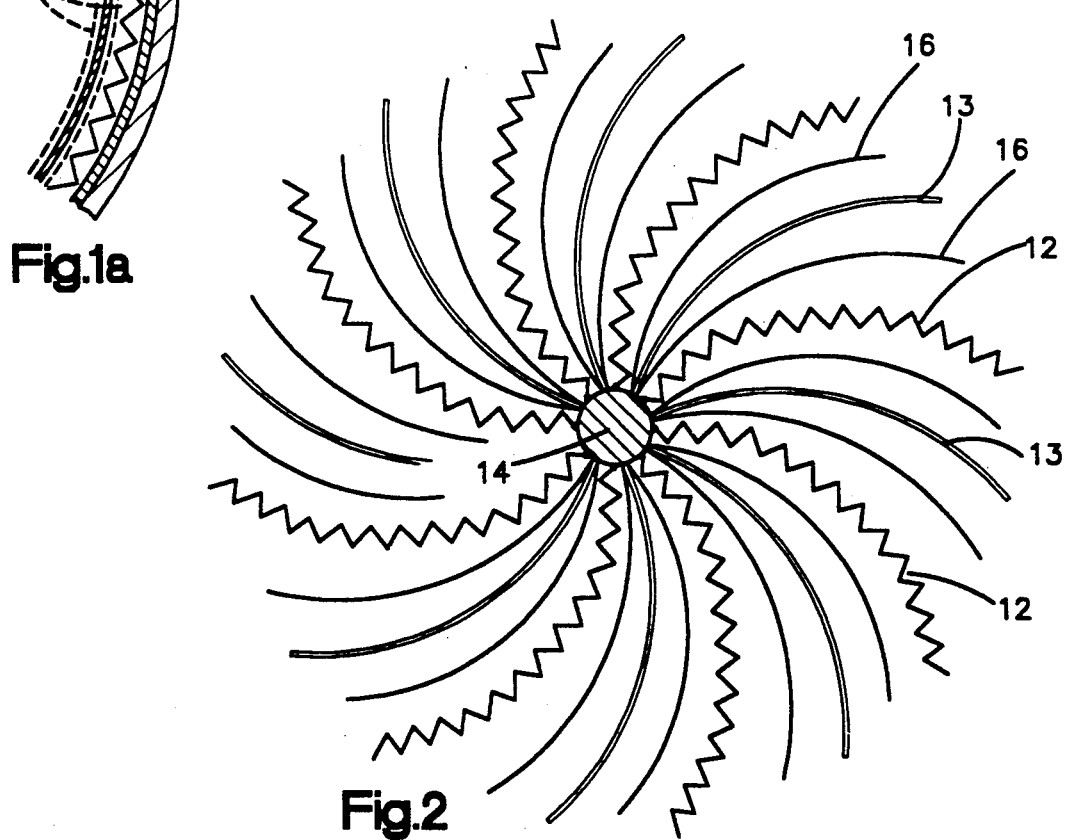
Fig.2

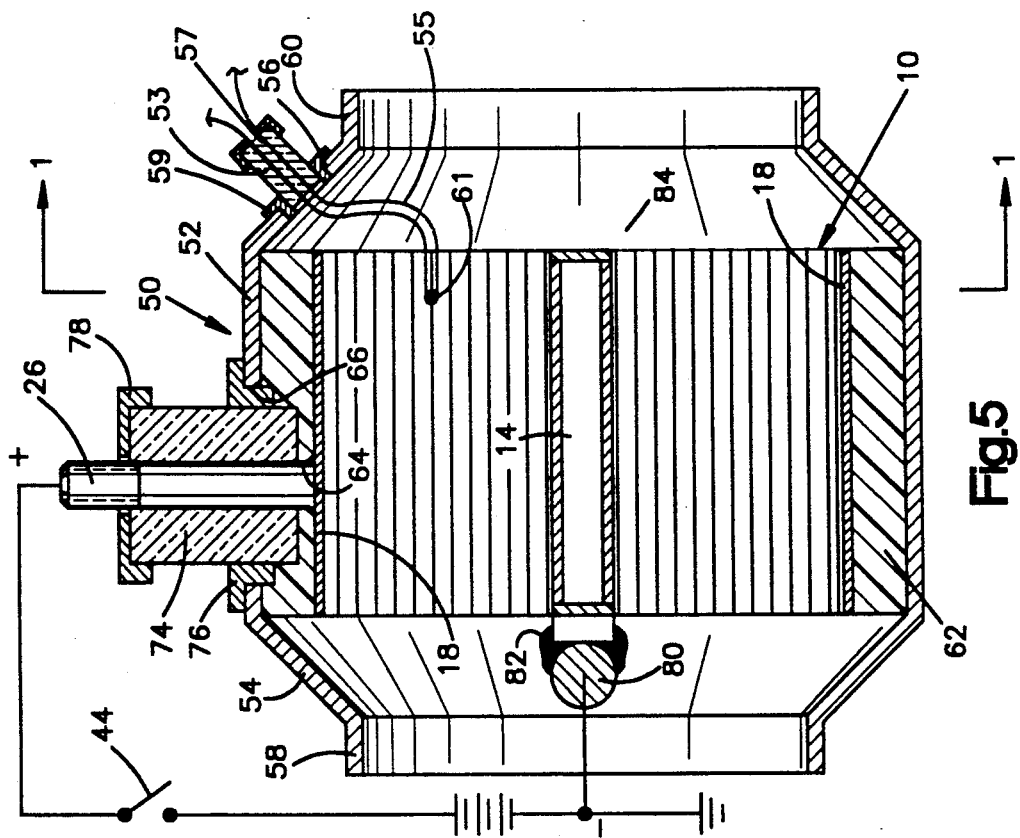
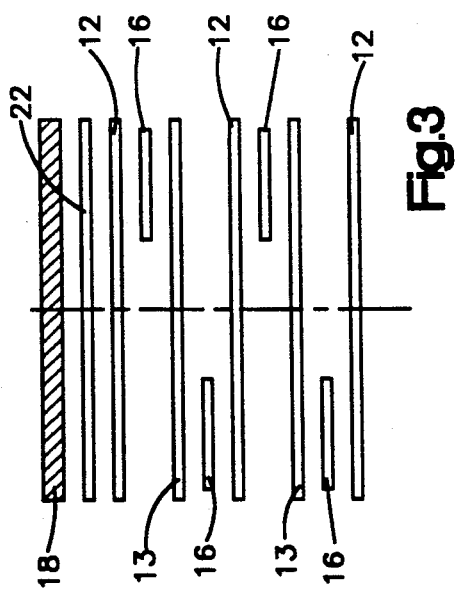
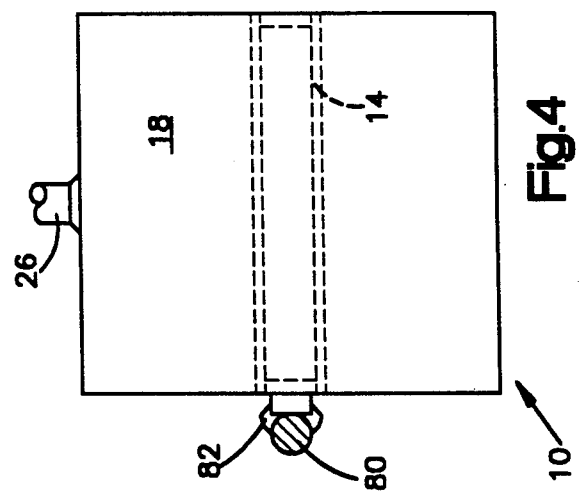

5,174,968

STRUCTURE FOR ELECTRICALLY HEATABLE CATALYTIC CORE

This invention relates to an improved structure for an electrically heatable catalytic core and, more particularly, to an electrically heatable catalytic core which resists telescoping in the course of a severe testing regime as described below.

BACKGROUND OF THE INVENTION AND PRIOR ART

The purpose of a catalytic converter is to convert pollutant materials in engine or turbine exhaust, e.g., carbon monoxide, unburned hydrocarbons, nitrogen oxides etc., to carbon dioxide, nitrogen and water. Conventional catalytic converters utilize a ceramic honeycomb monolith having square or triangular straight-through openings or cells with catalyst deposited on the walls of the cells, catalyst coated refractory metal oxide beads, e.g., alumina beads, or a corrugated thin metal foil monolith, e.g., ferritic stainless steel foil, having catalyst carried on or supported by the surface The catalyst is normally a noble metal, e.g., platinum, palladium, rhodium, ruthenium, or a mixture of two or more of such metals. The catalyst catalyzes a chemical reaction, mainly oxidation, whereby the pollutant is converted to a harmless by-product which then passes through the exhaust system to the atmosphere. However, conversion is not efficient initially when the exhaust gases are relatively cold. To be effective at a high conversion rate, the catalyst and the surface of the converter with which the exhaust gases come in contact must be at a minimum temperature, e.g., 390° F. for carbon monoxide, 570° F. for voltile organic compounds (VOC) and 1000° F. for methane or natural gas. Otherwise, conversion to harmless by-products is poor and cold start pollution of the atmosphere is high. Once the exhaust system has come to its operating temperature, the catalytic converter is optimally effective. Hence, it is necessary to contact relatively cold exhaust gases with hot catalyst to effect satisfactory conversion at engine start-up. Both compression ignited (diesel) and spark ignited engines have this need.

To achieve initial heating of the catalyst prior to engine start-up, there is provided an electrically heatable catalytic converter formed of a corrugated thin metal foil monolith which is connected to a voltage source, e.g., a 12 volt or 14 volt automotive battery, and power supplied, preferably before and during start-up, to elevate and maintain the temperature of the catalyst to at least about 650° F.

Copending application Ser. No. 587,219 filed 24 Sep. 1990 (and its parent case Ser. No. 524,284 filed 16 Apr. 1990, now abandoned) discloses one form of electrically heatable catalytic converter which has been found to be subject to telescoping of the core, and provides one means for offsetting the tendency to telescoping of the core in operation and ultimate destruction thereof in the face of "Hot Shake" automotive proof tests. The present invention provides a different means for offsetting the tendency to telescope. Because much of the disclosure of Ser. No. 587,219 is relevant to the present application, the disclosure of Ser. No. 587,219 is incorporated herein by reference thereto. Instead of utilizing a ceramic core in juxtaposition with the electrically heatable catalytic core to inhibit telescoping, the present invention utilizes inter-leaf brazing whereby the leaves are held against telescoping or axial displacement. Ser. Nos. 524,284 and 587,219 are commonly owned with the present application.

Copending application Ser. No. 606,130 filed 31 Oct. 1990, now U.S. Pat. No. 5,070,694 by William A. Whittenberger and entitled Structure for Electrically Heatable Catalytic Converter, and commonly owned with the present application, discloses a means for preventing telescoping of a spiral or S-wound corrugated thin metal foil monolith by brazing between the corrugated leaves according to a pattern (staggered relation). In that application, all of the leaves forming the monolith are corrugated. The adjacent leaves or strips are in a nonnesting relationship by virtue of (1) pattern corrugations, such as herringbone corrugation, or (2) straight-through corrugations using corrugated leaves with straight cells of differing pitch. (See U.S. Pat. No. 4,810,588 dated 7 Mar. 1989 to Bullock)

The present application is quite similar to the aforesaid U.S. Pat. No. 5,070,694, except that the monolith is made up of both corrugated and flat thin stainless steel strips. Nesting is not a problem with a structure in which corrugated foil strips are alternated with flat strips. However, telescoping of the core under the severe conditions of the "Hot Shake" test described below is still a problem.

Reference may also be had to U.S. Pat. No. 4,381,590 dated 3 May 1983 to Nonnenmann et al which discloses a spirally wound monolith made up of corrugated and flat continuous strips which are brazed together. The present invention utilizes a plurality of strips, corrugated alternating with flat, all emanating from a central core and having a length so as to get appropriate wattage (on a 12 volt battery voltage source) between the central core and the outer shell. Generally, this power level ranges from about 1500 watts to about 12000 watts. Reference may be had to Ser. No. 587,219, supra, Tables I and II.

The electrically heatable catalytic cores hereof are normally spirally wound, or S-wound, corrugated and flat thin metal foil strips in alternating laminar relation. The corrugated and flat thin metal foil strips are not initially washcoated with a refractory metal oxide coating, e.g., an alumina coating, and a catalyst. The latter treatment steps come later according to the present invention for reasons which will appear. The corrugated and flat thin metal cores are subjected to a severe test which they must pass in order to be acceptable for automotive use. This test (so called "Hot Shake Test") involves oscillating (100-200 Hertz and 28 to 60 G inertial loading) the device in a vertical attitude at high temperature (between 700° and 950° C., 1292° F. and 1742° F., respectively) with exhaust gas from a running internal combustion engine being passed through the device. If the electrically heatable catalytic device telescopes in the direction of gas flow or breaks up after a predetermined time, e.g., 5 to 200 hours, the device is said to fail the test. Usually, the test device will fail in 5 hours if it is going to fail. Five hours is equivalent to 1.8 million cycles at 100 Hertz.

Accordingly, it is a principal object of &he present invention to provide a device which will pass the foregoing test and thereby prove reliable in extreme field service.

Reference may be had to U.S. Pat. No. 3,768,982 to Kitzner dated 30 Oct. 1973. In this patent, heat from a centrally located electric heater is transferred by conduction through a monolithic catalyst support to heat the catalyst to optimum operating temperature. Reference may also be had to U.S. Pat. No. 3,770,389 to Kitzner dated 30 Oct. 1990 which discloses a central electrically heated core within a ceramic monolith, heat being transmitted by conduction to the catalyst contained in the openings of the ceramic monolith. The heating core is formed of metal sheets, one corrugated, the other flat, coated with alumina and also bearing a catalyst. The metallic core is heated electrically by virtue of its own electrical resistance. Heating of the ceramic core by conduction takes too long to solve the problem of atmospheric pollution at start-up. These cores are, moreover, subject to telescoping under the conditions of the foregoing severe test.

Reference may also be had to U.S. Pat. No. 4,711,009 to Cornelison et al dated 8 Dec. 1987 for details of a process for corrugating thin metal foil strips. The coating of the surface with a refractory metal oxide is not done in the present case or the application of the catalyst as described in that patent. These steps cannot be performed in the present case as the resulting surfaces cannot be brazed. Also, for brazing purposes, it is desirable not to stress relieve aluminum-containing stainless steels as there is a tendency to form oxides on the surface to which the brazing does not adhere well. However, the corrugating of a thin metal foil strip with a herringbone, or chevron pattern as taught therein is applicable to the present application and to that extent, the disclosure of the aforesaid U.S. Pat. No. 4,711,009 is incorporated herein by reference. The refractory metal oxide coating and the catalyst are applied by dipping in the present process after formation of the core. The composition of the washcoat and the catalyst treating solutions as taught in U.S. Pat. No. 4,711,009 are pertinent to the present process.

Reference may also be had to International PCT publication numbers WO 89/10471 and WO 10470 each filed 2 Nov. 1989. S-wound cores composed of corrugated and flat strips in alternating relation are disclosed in these publications. However, there is no teaching of brazing between the corrugated thin metal foil layers, and telescoping of the core under the conditions of the severe test described above occurs.

In the following description, reference will be made to "ferritic" stainless steel. A suitable formulation for this alloy is described in U.S. Pat. No. 4,414,023 dated 8 Nov. 1983 to Aggen et al. A specific ferritic stainless steel useful herein contains 20% chromium, 5% aluminum, and from 0.002%to 0.05% of at least one rare earth metal selected from cerium, lanthanum, neodymium, yttrium and praseodymium, or a mixture of two or more thereof, balance iron and steel making impurities.

In the following description, reference will also be made to fibrous ceramic mat or insulation. Reference may be had to U.S. Pat. No. 3,795,524 dated 5 Mar. 1974 to Sowman for formulations and manufacture of ceramic fibers and mats useful herein. One such ceramic fiber material is currently commercially available from 3-M under the registered trademark "INTERAM."

BRIEF STATEMENT OF THE INVENTION

Briefly stated, the present invention is an improved structure for an electrically heatable catalytic converter. The structure is characterized by a plurality of corrugated thin metal leaves or strips each in alternating relation with flat metal leaves or strips extending from an electrically conducting central core, these leaves being in alternating relation with thin narrow brazing metal strips. The thin, narrow brazing metal s&rips are staggered from side to side of the thin metal strips or leaves. lying adjacent first one marginal edge of a thin metal strip, and then adjacent the opposite marginal edge of the next succeeding thin metal strip. The assembly of from 12 to 40 thin metal strips (alternating corrugated and flat) and the interleafed thin narrow brazing strips is then spirally wound, or S-wound, into a tight core, and a retaining shell placed around the tightly wound core with an intervening wrapping of brazing metal and the whole unit heated to a temperature sufficient to fuse the brazing metal, e.g. 2100° to 2300° F. Simultaneously, the interleafed brazing strips are fused, and the assembly becomes a rigid unit. Then the entire unit is dipped into a washcoat of a refractory metal oxide dispersed in water, and the coating baked to tightly adhere the metal oxide, usually gamma alumina, with or without a small amount of ceria, to the metal surface. Then a noble metal catalyst is deposited on the metal oxide surface from an aqueous solution of the noble metal. The temperature is then raised to decompose the noble metal containing compound and deposit the catalyst on the surface. Alternatively, the catalyst may be dissolved in the aqueous medium of the washcoat before dipping.

In use, a voltage source, usually a 12 or 24 volt automotive battery, is connected across the central conductive bar and the outer retaining shell to provide power to heat the monolith to a minimum of about 650° F. in about 5 to about 30 seconds. Power in the range of 1500 to 12000 watts may be supplied through a MOSFET power supply system such as described in copending applications Ser. No. 587,219, supra, and Ser. No. 524,284 filed 16 Apr. 1990.

The resulting catalytically active electrically heatable unit now will resist telescoping during the severe test outlined above. Moreover, the current, instead of flowing through the brazing locations from one leaf to the next, will flow mainly along the length of the corrugated thin metal strip and the flat thin metal strip as it provides the shortest path from negative to positive. This provides for uniform heating per unit volume and avoids hot spots that would have an adverse effect on the catalyst.

BRIEF DESCRIPTION OF THE DRAWINGS

The invention will be better understood by having reference to the annexed drawings showing a preferred embodiment of the invention and wherein:

FIG. 1 is a cross-sectional view of an electrically heatable catalytic core in accordance herewith showing the inter-leafed brazing strips in alternating relation with corrugated thin metal foil strips and with the flat thin metal strips, and showing the general connections for supplying power to the core. FIG. 1a is an enlargement of a portion of FIG. 1.

FIG. 2 is a cross-sectional view showing the outerleafing of brazing strips and the plural corrugated and the plural flat thin metal foil strips, secured to a central post, prior to winding in a tight spiral form as shown in FIG. 1.

FIG. 3 shows the pattern of alternation between the corrugated thin metal strips and the flat thin metal strips, and the brazing strips, and the staggered relation of the brazing strips with respect to a transverse center plane lying perpendicular to the central post in FIGS. 1 and 2.

FIG. 4 is a side elevation of the electrically heatable core of FIG. 1.

FIG. 5 is a cross-sectional view of a completed electrically heatable catalytic converter in accordance with this invention.

DETAILED DESCRIPTION OF THE DRAWINGS

As indicated above, the present invention is in a structure for an electrically heatable catalytic core and a converter containing the same. This core is able to withstand the severe "Hot Shake" test described above without telescoping.

Referring more particularly to FIGS. 1 and 2, there is here shown in cross-section an electrically heatable catalytic core, generally indicated at 10. The core 10 is composed of a series of corrugated thin metal strips 12 secured to a central post 14 by an suitable means, the corrugated strips 12 being in alternating relation with flat thin metal strips 13, also secured to the central post 14. The preferred securing means is spot welding. Alternatively, and as shown in the aforesaid Ser. No. 524,284, the central post 14 may be made up of a group of individual wires or rods with a thin herringbone corrugated metal strip overfolded over each wire. The individual wires with strips welded thereto are gathered together in a bundle and welded at the ends to form the central post 14. In the present and preferred case, one end of each strip is tack welded to a stainless steel or nickel center post or tube 14 which is closed at at least one end. The corrugated and the flat thin metal strips are from about 1.5" to about 3.6" wide and from 8 to 24 inches long, e.g. 12" long. The length of the strips is calculated from the resistance of the thin metal strip per unit length and the desired power level between the central core 14 and the shell 18. Corrugation is done by passing between rolls having the corrugation pattern formed therein. Reference may be had to U.S. Pat. No. 4,711,009, supra, for details of one mode of forming corrugated thin metal strips useful herein. The corrugated thin metal strips are desirably stainless steel, and preferably a ferritic stainless steel about 0.0015 to 0.0025 inch thick, e.g., 0.0016" thick. A particularly useful ferritic stainless steel contains 20% chromium, 6% aluminum, 0.002% to 0.05% of at least one rare earth metal selected from cerium, lanthanum, neodymium, Yttrium and praseodymium, or a mixture thereof, and the balance iron plus steel-making impurities. Reference may be had to U.S. Pat. No. 4,414,023 to Aggen et al dated 8 Nov. 1988 for suitable ferritic stainless steel alloys useful herein.

The corrugated thin stainless steel strip is corrugated continuously, preferably in a straight through sinusoidal or triangular (with apices rounded off) pattern and later cut to the desired length. The straight through corrugation pattern provides for reduced back pressure through the electrically heatable catalytic converter unit. Prior to coating the thin metal strips, both flat and corrugated, with a refractory metal oxide and catalyst, the strips are, as indicated, secured to a central post 14. Brazing strips 16 which are 0.05" to 1" wide and of a length equal to the length of the thin metal strips, are alternately located (FIGS. 2 and 3) and positioned in staggered relation (FIG. 3). Thereafter, the central post 14 is twisted and the thin metal foil and brazing foil strips spirally wound into a tight cylinder as shown in FIG. 1 and encased in a binding tube 18 of stainless steel or nickel, or other suitable metal. In order to provide better electrical contact between the binding tube 18 and the spirally wound core 20, a layer of brazing foil 22 is desirably interposed between the core 20 and the binding tube 18. The tube 14 is desirably circular and closed at at least one end to force the exhaust gas through the foil portion of the converter. The brazing foil layer 22 has an axial length equal to the axial length of the thin metal strips 12 and 13. The binding tube 18 may conveniently be formed of two metallic half shells, e.g., stainless steel, nickel, or the like, to be welded together on assembly.

The brazing foil is rolled or strip cast to about 0.001" to about 0.003" thick. Alternatively, brazing paste, brazing wire or preforms may be used. The braze material is desirably a nickel/chromium/boron/silicon brazing alloy analyzing 75% to 83% nickel with a liquidus temperature of 2100° to 2300° F. such as commercially available from Allied Metglas Products of Parsippany, N.J. See specifically alloys 50/50A and 80/80A as currently available.

Where a platinum group metal is to be used as the catalytic agent, phosphorus is avoided in the alloy. Other nickel-containing brazing alloys containing from 7% to 14% chromium, 3% to 4.5% iron, 3.5% to 4.5% silicon, 2% to 3% boron, balance nickel and having liquidus temperatures of above about 2100° F. may also be used. After fusing, the fused brazing material holds the stainless steel corrugated and flat strips together in substantially the known corrugated/flat spiral or S-wound configuration as shown in the aforesaid WO 89/10471, supra.

After the core of FIGS. 1 and 1a is fully assembled, it is heated to a temperature sufficient to fuse the brazing strips 16 and 22 to the contiguous members This has the effects of securing the corrugated and flat strips together without significantly adding to the overall diameter of the core, and preventing telescoping of the core in the direction of gas flow during the severe high frequency and high temperature "Hot Shake" test described above. The overall open area of the catalytic core ranges from about 80% to about 90% and is not materially changed by the use of the thin brazing foil as this fuses and for all practical purposes merely bonds the thin stainless steel strips together.

To coat the surface of the thin metal strips, the entire unit is dipped into a slurry of a refractory metal oxide, e.g., an alumina slurry, preferably one containing a minor amount of ceria, e.g. from 0.5% up to about 25% by weight of the solids. The unit (FIG. 4) after wiping off the excess slurry from the outer shell is then baked at a temperature sufficient to remove the liquid base (water, principally) from the coating and set to coating on the surface, e.g. about 1000° F. The unit (FIG. 4) is then dip coated with an aqueous solution of a noble metal catalyst material. The porous nature of the gamma alumina coating traps and absorbs the aqueous catalyst-containing solution. Heating of the catalyst treated core to the decomposition temperature of the catalyst-containing compound yields the catalyst metal on the substrate. The noble metals useful as catalysts are palladium, platinum, rhodium, ruthenium and mixtures of two or more of such metals. Reference may be had to U.S. Pat. No. 4,711,009 for details of catalytic solutions useful in applying the catalyst to &he refractory metal oxide washcoated surface.

At this point, a terminal post 26 is secured to the outside of the outer shell 18 as by welding. One of the poles of a voltage source, e.g., the positive pole of an automotive vehicle battery, is later secured to the terminal post 26 by a suitable cable. The opposite pole of the voltage source, e.g., the negative pole of an automotive vehicle battery is later attached to the central post 14 by a suitable cable. To effect rapid heating of the electrically heatable catalytic core, considerable power must be drawn from the voltage source. For details of a suitable power supply system, reference may be had to Ser. No. 587,219, supra.

When the assembly as shown in FIG. 4 is completed, it is placed in a suitable housing such as shown in FIG. 5. FIG. 5 shows a completed electrically heatable catalytic converter, generally indicated at 60. There is provided a steel, preferably stainless steel, housing 52 having adapter end caps 64 and 66 having nipples 58 and 60 which reduce the diameter to the diameter of the exhaust pipe, not shown. The unit 10 (See FIGS. 1-4) is disposed within the housing 52 which is conveniently formed of half shells welded together at the seam, and the end caps 54 and 56 later welded on. Because the outer metal binder shell 18 will become positively charged, it must be insulated from the housing 62, and to this end a flexible ceramic insulation mat 62 (such as described in U.S. Pat. 3,795,524, supra, is interposed between the housing 52 and the metal binder shell 18. An aperture 64 is provided in the mat 62 to accommodate the positive terminal post 26 and suitable insulation means are provided for traversing the housing 52. There is provided an aperture 66 through the housing 52 into which is threadedly engaged a bushing 76 which holds an insulating sleeve 74 which in turn surrounds the post 26. A metal cap 78 provides a seat for a positive cable clamp, not shown. Current flows to the central post 14 through a transverse bar 80 welded as at 82 to the central post 14 at its midpoint and to the end cap 64 at its extremities. Alternatively, one end of the transverse bar 80 may be extended through end cap 54 and threaded to accept a cable connector from the battery. The flow of power to the electrically heatable unit 10 is effected by suitable switching means 44. Reference may be had to Ser. No. 587,219, supra, for the details of a suitable power switching means.

The temperature of the core 10 is conveniently sensed by a thermocouple 56 extending through the housing 52 with a metal bushing 59. A suitable insulating sleeve 58 and an inner tube 57 wherein the conducting leads from the junction 61 are carried spaced from each other as is known, extends into the interior of the housing 52. The leads terminate in a junction 61 which is embedded in the core 10.

There have thus been provided means for securing spirally wound, or S-wound, corrugated plus flat, thin me&at foil strips against telescoping under severe testing conditions. No intra-core insulation is required in the devices hereof. The flow of current through the entire foil strip lengths is preserved because there is sufficient inter-lamination dielectric strength to prevent lamination-to-lamination shorting of any significant amount of current. Interlamination shorting has the effect of (1) lowering the characteristic resistance of the assembly (which is undesirable) and (2) concentrating the electrical energy more in the center of the core rather than evenly distributing it across the exhaust gas intercepting face of the core. Current will prefer to flow from one end of the thin metal strip at the central post to the other at the inner periphery of the housing. The appropriate resistance in ohms is thus provided. The refractory metal oxide coating on the surface of the foil strips has a high dielectric strength and for all practical purposes prevents shorting between contiguous layers of foil except in the areas where the brazing metal is located. Hence, the electrical integrity and performance of the device as disclosed in the aforesaid Ser. No. 587,219 is preserved. The devices hereof may be used alone or in tandem with conventional ceramic catalytic converters in a given exhaust system.

What is claimed is:

1. An electrically heatable core for an electrically heatable catalytic comprising (a) a central electrically conductive post, (b) a monolith spirally wound about said central post including (1) a plurality of corrugated thin metal strips of substantially equal length secured to said central electrically conductive post, (2) a plurality of flat thin metal strips of substantially equal length and width to said corrugated thin metal strips also secured to said central electrically conductive post and being in alternating relation with said corrugated thin metal strips and (3) a plurality of fusible brazing areas, each said brazing areas being defined by a fusible brazing alloy strip having a width of from about 174 to 1/100 of the width of said corrugated and flat thin metal strips and a length substantially equal to the length of said corrugated and flat thin metals strips, said brazing areas being in alternating relation with said corrugated thin metal strips and said flat thin metal strips and in staggered relation with respect to a centrally located plane normal to the longitudinal axis of said central core, each of said fusible brazing strips begin thermally fused to a contiguous corrugated thin metal strip, and to a contiguous flat thin metal strips, respectively, and (c) a metallic retaining shell surrounding said spirally wound monolith.

2. An electrically heatable core as defined in claim 1 having a current conducting binding post radially extending from said metallic retaining shell.

3. An electrically heatable core as defined in claim 1 having a terminal post attached to said central electrically conducting post.

4. An electrically heatable core as defined in claim 1 wherein the corrugated thin metal strips are secured to the central post at one end of the corrugated thin metal strip and the alternating flat thin metal strips are secured to the central post at one end of the flat thin metal strip.

5. An electrically heatable core as defined in claim 4 wherein both the corrugated thin metal strips and the flat thin metal strips are spot welded to the central post.

6. An electrically heatable core as defined in claim 1 where both the corrugated thin metal strips and the flat thin metal strips are stainless steel.

7. An electrically heatable core as defined in claim 6 wherein the stainless steel is a ferritic stainless steel.

8. An electrically heatable core as defined in claim 1 wherein the corrugated thin metal strips have a coating of a refractory metal oxide on at least one surface thereof.

9. An electrically heatable core as defined in claim 8 wherein the refractory metal oxide comprises alumina.

10. An electrically heatable core as defined in claim 8 wherein the refractory metal oxide is gamma alumina.

11. An electrically heatable core as defined in claim 1 wherein a fused layer of thin brazing metal is disposed between the spirally wound monolith and the retaining shell.

12. An electrically heatable core as defined in claim 8 wherein a noble metal catalyst is supported on the refractory metal oxide surface of the corrugated and flat thin metal strips.

13. An electrically heatable core as defined in claim 12 wherein the noble metal is selected from platinum, palladium, rhodium, ruthenium and mixtures of two or more of such metals.

14. An electrically heatable catalytic converter comprising (a) a housing, (b) an end cap at each end of said housing including a nipple adapted to accommodate an exhaust pipe, (c) an electrically heatable core comprising (I) a central electrically conductive post, (II) a monolith spirally wound about said central post including (1) a plurality of corrugated thin metal strips of substantially equal length secured to said central electrically conductive post, (2) a plurality of flat thin metal strips of substantially equal length and width to said corrugated thin metal strips also secured to said central electrically conductive post, said flat thin metal strips being in alternating relation with said corrugated thin metal strips and (3) a plurality of fusible brazing strips, having a width of from about 174 to 1/100 of the width of said corrugated and flat thin metal strips and a length substantially equal to the length of said corrugated and flat thin metal strips, said brazing areas being in alternating relation with said corrugated thin metal strips and said flat thin metal strips, respectively, and in staggered relation with respect to a centrally located plane normal to the longitudinal axis of said central electrically conductive core, said brazing strips being fused to the adjacent corrugated thin metal strips and to the alternate flat thin metals strips, (4) a refractory metal oxide coating on at least one surface of each of said corrugated thin metal strips and said flat thin metal strips, (5) a noble metal catalyst supported on said refractory metal oxide coating, and (III) a metal retaining shell surrounding said spirally wound monolith, (d) means for electrically insulating said electrically heatable core from said housing, and (e) means for supplying electrical power from a voltage source to said electrically heatable core.

* * * * *

UNITED STATES PATENT AND TRADEMARK OFFICE
CERTIFICATE OF CORRECTION

PATENT NO. : 5,174,968
DATED : December 29, 1992
INVENTOR(S) : William A. Whittenberger It is certified that error appears in the above-identified patent and that said Letters Patent is hereby corrected as shown below:

Claim 1, column 8, line 22, change "174" to "1/4".

Claim 1, column 8, line 30, change "begin" to "being".

Claim 14, column 10, line 1, change "174" to "1/4".

Claim 14, column 10, line 4, change "brazing areas" to "brazing strips".

Signed and Sealed this

Sixteenth Day of November, 1993

Attest:

BRUCE LEHMAN

*Attesting Officer*  *Commissioner of Patents and Trademarks*